T. Clark,

Steam Safety Valve.

No. 1,031. Reissued Aug. 28, 1860.

UNITED STATES PATENT OFFICE.

TIMOTHY CLARK, OF BEDFORD, NEW YORK, ASSIGNOR TO CLARK'S PATENT STEAM AND FIRE REGULATOR COMPANY.

IMPROVEMENT IN SAFETY APPARATUS FOR STEAM-BOILERS.

Specification forming part of Letters Patent No. 5,254, dated August 21, 1847; Reissue No. [illegible], dated August 28, 1860.

*To all whom it may concern:*

Be it known that I, TIMOTHY CLARK, of Bedford, Westchester county, and State of New York, have invented a new and useful Improvement for Regulating the Pressure of Steam in Steam-Boilers; and I do hereby declare that the following is a full, clear, and exact description thereof, reference being had to the accompanying drawings, making part of this specification, in which—

Figure 1:
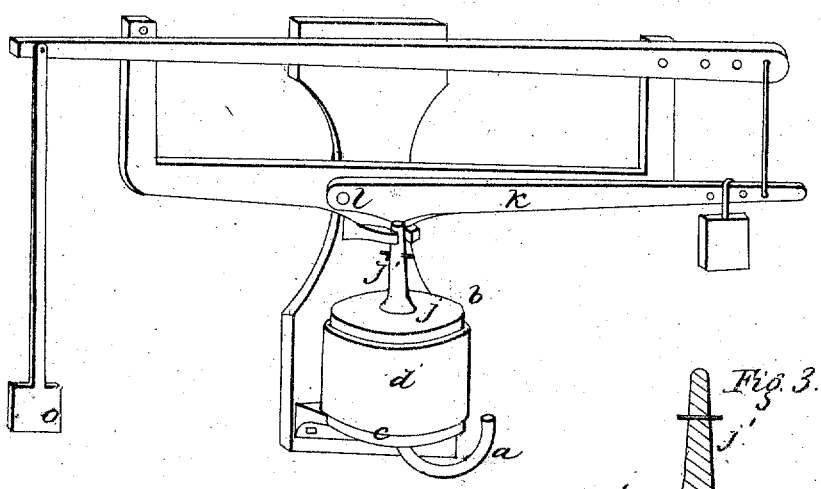
Figure 2:
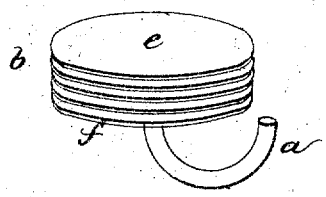
Figure 3:
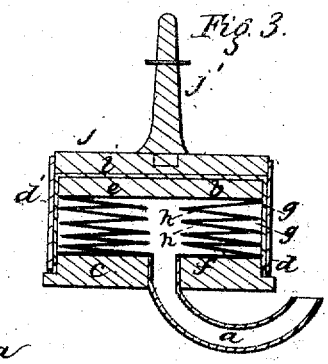

Figure 1 is a perspective view of the apparatus; Fig. 2, a separate view of the expansible vessel, and Fig. 3 a vertical section of the same with the surrounding case.

The same letters indicate like parts in all the figures.

Prior to my invention attempts were made to regulate the generation of steam in steam-boilers by the pressure of the steam in the boiler, but so far as I am informed without success. One of the methods, and probably the nearest approximation to a practical result, so tried before my said invention, was by means of a packed and loaded piston, sliding in a cylinder connected by a pipe with the boiler, so that the steam generated should act against the face of such piston to force it up as soon as the pressure should exceed the required degree, the said piston being in turn connected with the damper, register, or valve controlling the draft or blast to the fire; but this was defective, for the reason that the range of power required to overcome the friction of the packing of the piston was too great to answer the purposes of regulation.

The object of my invention is to regulate the combustion of the fire in steam-boiler furnaces by the pressure of the steam generated in the boiler by a mechanism so organized that if the engineer sets the apparatus to generate steam at any determined pressure—say, twenty pounds to the square inch—so soon as the pressure in the boiler slightly exceeds that pressure the draft or blast shall be automatically checked to reduce the combustion and thereby reduce the generation of steam, and so soon as the pressure falls slightly below that determined pressure the draft or blast shall be increased to excite the combustion, and thereby increase the generation of steam. To effect this purpose the apparatus must be very sensitive—that is, must be affected by a very slight variation of pressure in the boiler; otherwise it would be better to rely upon the attention of the engineer to effect the regulation.

To accomplish the above result, my said invention consists in the employment of an expansible vessel made partly or wholly of some flexible material so constructed that it may be expanded by a fluid inside under pressure to produce motion in a desired direction, and contracted by a force greater than that of the contained fluid to produce an opposite motion, when such vessel is combined with a steam-boiler, so that the contained fluid shall be acted upon by the pressure of the steam in the boiler, and with the damper, valve, register, or equivalent means for regulating the draft or blast of the furnace, so that when the steam generated in the boiler exceeds the required pressure the said vessel shall be expanded and thereby operate the damper or equivalent which controls the draft or blast to check the combustion in the furnace and reduce the generation of steam, and when the pressure in the boiler descends below the required pressure the said vessel shall be contracted by the opposite force, whether weight, spring, or equivalent therefor, and thereby cause the damper, or equivalent, to be opened to excite the combustion in the boiler, and thereby increase the generation of steam.

The accompanying drawings represent the mode in which I have successfully applied the principle of my said invention.

In the said drawings, *a* represents a bent tube, one end of which is to communicate with the inside of a steam-boiler, and the other end with the inside of the expansible vessel *b* through the bottom plate thereof, and passing through a plate, *e*, which forms at the same time the bottom of the surrounding protective case *d*. The sole purpose of the bend in the said tube is to retain water or other liquid in the vessel, as I prefer to interpose a liquid between the vessel and the steam in the boiler; but if preferred this may be dispensed with and the steam may act directly. The vessel *b* is composed of two disks, *e* and *f*—one at top and the other at bottom—and a series of rings, *g h*, connected in the following manner—viz: The edge of disk *e* is secured to the outer edge of the upper one of the series of rings *g*, and the inner edge of this ring is secured to the inner edge of the upper one of the series of rings *h*. And in turn the outer edge of the said ring *h* is secured to the next of the series of rings *g*, and the inner edge of this to the inner edge of another ring, *h*, and so through the series, the outer edge of the last of the series of rings *h* being secured to the edge of the lower or bottom disk, *f*, to complete the expansible vessel. All the joints should be air-tight to prevent leakage. This vessel I have made successfully of thin sheet metal, but other flexible materials may be substituted, care being taken to have the flexibility suited to the purpose, as, for instance, if the apparatus is required to be very sensitive—that is to say, so that it shall operate by very slight variations of pressure—then the material should be very flexible. This expansible vessel may be placed within a protecting-case, *d*, and over this an outer inverted case, *d'*, may be placed to protect the expansible vessel against injury and dirt. A disk, *i*, is placed on top of the expansible vessel and interposed between it and the top of the inverted case *d'*, and on top of this inverted case is placed another disk or plate, *j*, with a stem or rod, *j'*, the upper end of which is connected, as represented, with a lever, *k*, turning on a fulcrum-pin, *l*, the said lever being in turn connected by a rod, *m*, and another lever, or by other equivalent means, with the damper *o* of the furnace, or, as an equivalent, with the register or valve, or with the driving apparatus which regulates the blast of a blower. The lever *k* is to be weighted by a regulating weight or spring, as the force which is to balance the pressure of the steam in the boiler acting on the fluid inside the expansible vessel.

From the foregoing it will be seen that when the vessel is contracted the damper is wide open to give full draft or blast to the furnace. So soon as the steam in the boiler exceeds the required pressure its action on the inner surface of the disk *e* will force it up, the flexibility of the parts composing the said vessel permitting it to yield, and as this disk is forced up it operates the lever *k*, and, by the connections, the damper or its equivalent, thereby checking the draft or blast, which will check the generation of steam in the boiler, and thereby reduce the pressure to permit the damper, or its equivalent, to be reopened by the weight or equivalent. By varying the weight or other force which opens the damper, or its equivalent, and which contracts the flexible vessel, the pressure at which the steam shall be generated in the boiler can be regulated with the utmost accuracy, for so soon as the steam in the boiler exceeds that pressure it expands the flexible vessel and checks the combustion in the boiler, and vice versa.

Although I have above described the flexible vessel as composed of an upper disk connected with the bottom by two series of rings connected alternately by their inner and their outer edges—such construction being preferred by me for the reason that by increasing the number of such rings I can obtain an increased range of motion to render the apparatus more sensitive without making the upper disk of a diameter so great as to render it liable to be ruptured by the pressure—it will be obvious that other forms of flexible vessels may be substituted without departing from the principle or character of my said invention—as, for instance, a single flexible diaphragm, connected by its edge to form the cover of the vessel, will answer the purpose when only a slight range of motion is required.

What I claim as my invention, and desire to secure by Letters Patent, is—

The employment of a flexible vessel, substantially as described, when the inside of such vessel is combined and connected with a steam-boiler to be expanded by the steam generated therein, and the outside with the mechanism which operates the damper, or its equivalent, for regulating the draft or blast of the furnace, substantially as and for the purpose specified.

TIMOTHY CLARK.

Witnesses:
WM. H. BISHOP,
V. B. RYERSON.